United States Patent [19]

Gioutsos et al.

[11] Patent Number: 5,508,920
[45] Date of Patent: Apr. 16, 1996

[54] CRASH DISCRIMINATOR RESPONSIVE TO EARLY-CRUSH AND MULTIPLE-HIT SCENARIOS

[75] Inventors: Tony Gioutsos, Brighton; Daniel N. Tabar, Troy; Edward J. Gillis, South Lyon, all of Mich.

[73] Assignee: Automotive Systems Laboratory, Inc., Farmington Hills, Mich.

[21] Appl. No.: 329,077

[22] Filed: Oct. 25, 1994

[51] Int. Cl.$^6$ ............................................. B60R 21/32
[52] U.S. Cl. ............... 364/424.05; 340/436; 307/10.1; 280/735; 180/282
[58] Field of Search ............... 364/424.05; 340/436, 340/669; 307/10.1; 280/734, 735; 180/274, 282

[56] References Cited

U.S. PATENT DOCUMENTS

| | | | |
|---|---|---|---|
| 4,410,875 | 10/1983 | Spies et al. | 280/735 |
| 4,497,025 | 1/1985 | Hannoyer | 364/424.05 |
| 4,975,850 | 12/1990 | Diller | 364/424.05 |
| 4,985,835 | 1/1991 | Sterler et al. | 364/424.05 |
| 4,994,972 | 2/1991 | Diller | 364/424.05 |
| 5,014,810 | 5/1991 | Mattes et al. | 130/268 |
| 5,040,118 | 8/1991 | Diller | 364/424.05 |
| 5,068,793 | 11/1991 | Condne et al. | 364/424.05 |
| 5,157,268 | 10/1992 | Spies et al. | 307/10.1 |
| 5,229,943 | 7/1993 | Eigler et al. | 364/424.05 |
| 5,309,138 | 5/1994 | Tohbaru | 340/436 |
| 5,337,238 | 8/1994 | Gioutsos et al. | 364/424.05 |
| 5,339,242 | 8/1994 | Reid et al. | 364/424.05 |
| 5,363,302 | 11/1994 | Allen et al. | 364/424.05 |
| 5,377,108 | 12/1994 | Nishio | 364/424.05 |
| 5,394,326 | 2/1995 | Liu | 364/424.05 |

*Primary Examiner*—Vincent N. Trans
*Assistant Examiner*—Tyrone V. Walker
*Attorney, Agent, or Firm*—Lyman R. Lyon

[57] ABSTRACT

In a system and method for controlling actuation of a vehicle passenger safety device in response to an event possibly requiring actuation of the safety device, stored and rank-ordered values for received vehicle acceleration are used to generate a high-rank jerk measure ($j_H$), a median-ranked acceleration value ($a_M$) and a median-rank velocity measure ($v_M$), while raw acceleration information is further used to generate an "event-based timer" or event-progress measure (t'). These measures ($j_H$, $a_M$, $v_M$, t') are then used to generate a pair of event-identification measures ($m_1$, $m_2$) useful in identifying two specific crash types for which specialized acceleration-based event-severity measures other than the default event-severity measure ($m_0$) are best suited, specifically, where a series of negative jerks occurring relatively early in an event from a high transitory acceleration identify the occurrence of a sizable vehicle crush, or where a series of small jerks occurring relatively late in an event above a minimum velocity identifies a "multiple hit" event.

28 Claims, 2 Drawing Sheets

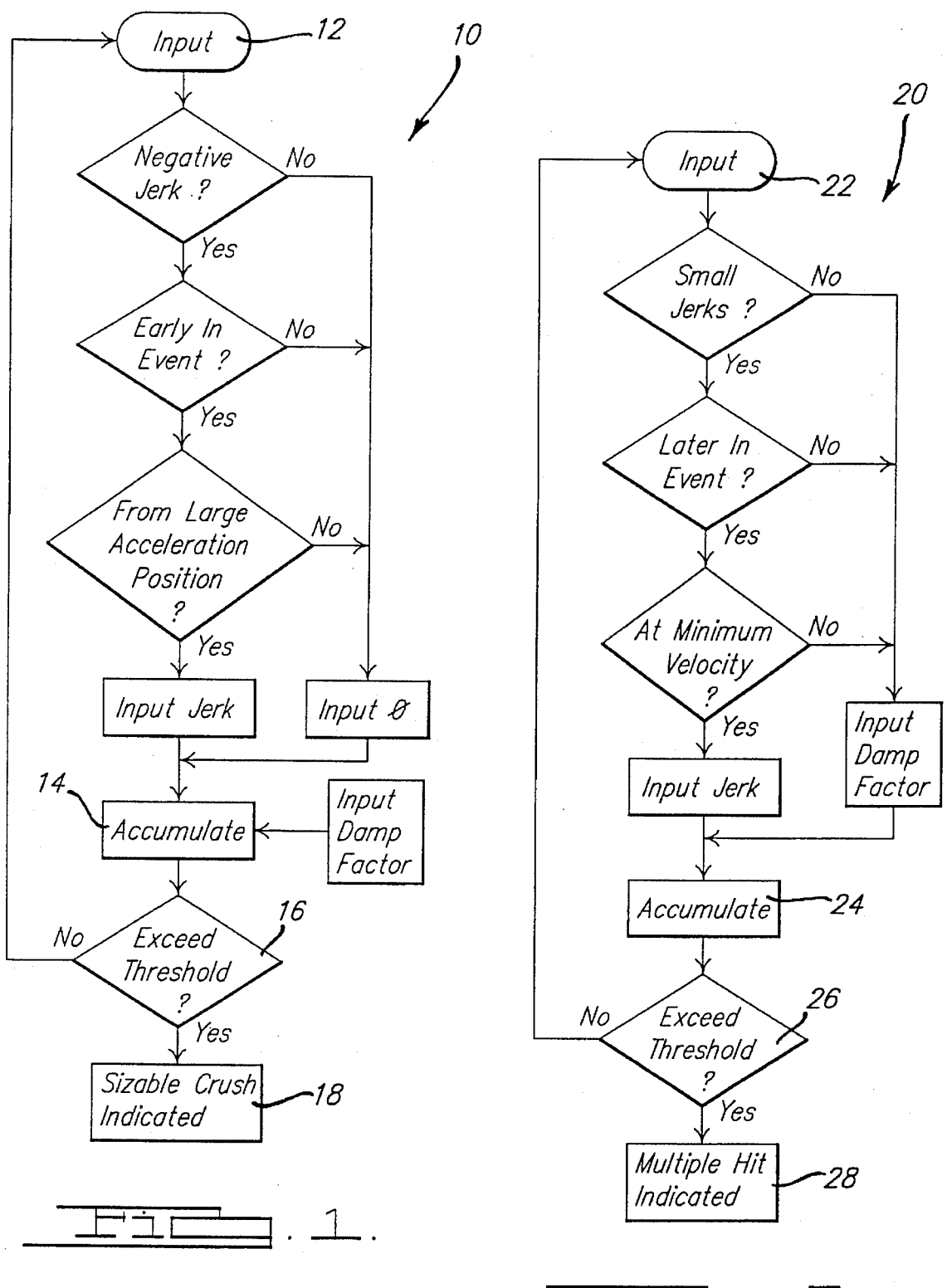

CRASH DISCRIMINATOR RESPONSIVE TO EARLY-CRUSH AND MULTIPLE-HIT SCENARIOS

BACKGROUND OF THE INVENTION

The instant invention relates to systems and methods for controlling actuation of vehicular safety devices and, more particularly, to a system and method which is capable of identifying specific crash scenarios or "events," the severity of which are better analyzed with event-severity measures other than a universal or "default" event-severity measure.

A variety of systems for actuating vehicular safety devices are well known in the art. Such systems are used to sense a crash condition and, in response to such a condition, to actuate an air bag, or lock a seat belt, or actuate a pretensioner for a seat belt retractor. Typically, the safety device is actuated or deployed into its protective position when an impact exceeding a predetermined magnitude is detected by the actuating system as through the comparison of a given change in one or more physical quantities, such as estimated vehicle velocity or a differential measure such as estimated vehicle jerk, with respective threshold values therefor.

In an improved system and method for crash discrimination taught in copending U. S. patent application Ser. No. 07/773,017 entitled "Predictor/Check Crash Discriminator," a modified vehicle velocity measure is used in combination with an estimate of transitory vehicle jerk to predict a future acceleration value for comparison with a threshold value therefor. More specifically, in this "prediction-based" system and method for crash discrimination, a modified velocity term is used as an event-based timer when predicting a value for future acceleration as the product of a jerk estimate multiplied by event-based time. In this manner, present acceleration information is extrapolated into the future so as to predict when a severe crash is in the making over a wide range of crash types.

Nonetheless, upon encountering certain crash types, such as an event causing a sizable vehicle crush, the resulting negative transitory values for the acceleration information forming the basis for one or more differential measures used in crash discrimination, such as the jerk measures discussed above, may in turn reduce the reliability of actual times-to-fire generated with that measure, specifically, by delaying (or ultimately not otherwise indicating any requirement for) actuation of the safety device. Rather, upon encountering an event causing a sizable vehicle crush, what is needed is a crash discriminator which will employ an alternate or supplemental event-severity measure better suited to analyzing a sizable vehicle crush upon identifying the occurrence thereof.

Similarly, upon encountering a "multiple-hit" event generating a crash waveform broadly characterized by a double hump, the negative intermediate values for the acceleration information again forming the basis of a differential measure such as a jerk measure likewise reduces the reliability of actual times-to-fire generated by known systems and methods which rely upon that differential measure to detect an event requiring actuation of the safety device. Again, what is needed is a crash discriminator which will employ an alternate event-severity measure better suited to analyzing a multiple-hit event upon identifying the occurrence thereof.

Accordingly, what is needed is a crash discriminator capable of identifying the occurrence of special events such as the crushing of the vehicle structure relatively early in a crash event, or a multiple hit scenario, whereupon an alternate or supplemental event-severity measure is used to control actuation of the safety device.

SUMMARY OF THE INVENTION

It is an object of the instant invention to provide a system and method for controlling actuation of a vehicle passenger safety device having a default or primary event-severity measure generally useful in controlling actuation of the safety device in response an event requiring such actuation, and an alternate or supplemental event-severity measure useful in controlling actuation of the safety device in response to identification of a sizable vehicle crush.

Another object of the instant invention is to provide a system and method for controlling actuation of a vehicle passenger safety device having a default or primary event-severity measure generally useful in controlling actuation of the safety device in response an event requiring such actuation, and an alternate or supplemental event-severity measure useful in controlling actuation of the safety device in response to identification of a multiple-hit event.

Under the invention, in an improved system and method for controlling actuation of a vehicle passenger safety device in response to an event possibly requiring actuation of the device, a default event-severity measure is generated from received vehicle acceleration information for ultimate comparison with a first predetermined threshold value. Correlatively, such received information is used to generate a differential measure, such as a value for transitory jerk; a measure correlated with the relative progress of the event; and a measure evaluative of the received information with respect to time, such as a filtered vehicle acceleration or velocity measure. The differential measure, event-progress measure, and evaluative measure are then used to identify at least one distinct crash type for which an alternative or supplemental event-severity measure is better suited than the default event-severity measure.

For example, under the invention, a jerk measure, an event-progress measure, and an acceleration measure can be used to identify the occurrence of a sizable vehicle crush, as by comparing each with a respective threshold value in the manner described more fully hereinbelow, thereby permitting actuation of the safety device-at a required time-to-fire earlier than that generated through use of the default event-severity measure. Similarly, under the invention, a jerk measure, an event-progress measure, and a velocity measure can be used to identify the occurrence of a multiple-hit scenario, again, permitting use of a dedicated event-severity measure which, in turns, ensures actuation of the safety device at an earlier required time-to-fire than would be possible when analyzing a multiple-hit event using the default event-severity measure.

More specifically, under the method of the invention, the occurrence of a sizable vehicle crush is identified by a negative jerk (as evidenced by the differential measure), at a point relatively early in an event (as determined by the event-progress measure), and from a relatively large transitory acceleration (as evidenced by the evaluative measure). Thus, in an exemplary implementation, negative jerk values are accumulated only when the transitory acceleration measure exceeds a minimum value while the progress measure remains less than a maximum value, with a damping factor preferably otherwise acting to reduce the resulting accumulated event-identification value irrespective of the sign or magnitude of the transitory jerk. The event-identification value is thereafter compared to a critical threshold. A sizable vehicle crush is indicated when the event-identification value exceeds that critical threshold, whereupon either the safety device is immediately actuated or an alternative/supplemental event-severity measure is selected whose specialized event-severity criteria are better suited to evaluating the severity of crush events than the default event-severity measure.

Similarly, under the method of the invention, the occurrence of a multiple-hit event is identified by relatively small jerks (as evidenced by the differential measure), at a point relatively late in an event (as determined by the event-progress measure), and at a relatively large transitory vehicle velocity (as estimated by the evaluative measure). Thus, in an exemplary implementation, jerk values are accumulated only when the transitory velocity value exceeds a minimum value while the progress measure likewise exceeds a respective minimum value therefor, with a damping factor preferably otherwise acting to reduce the resulting accumulated event-identification value. The event-identification value is thereafter compared to a critical threshold. A multiple-hit event is indicated when the event-identification value exceeds that critical threshold, whereupon either the safety device is immediately actuated or an alternative/supplemental event-severity measure is selected whose specialized event-severity criteria are better suited to evaluating the severity of crush events than the default event-severity measure.

Thus, it may be said that the system and method of the invention uses a differential measure, an event-progress measure and an evaluative measure to identify events best evaluated using a supplemental event-severity measure (or to identify events otherwise requiring immediate actuation of the safety device), thereby providing an event-based crash discriminator which responds to a wider range of crash types than is possible using a single "universal" event-severity measure.

BRIEF DESCRIPTION OF THE DRAWING

FIG. 1 is a flow chart illustrating generally a first method useful for discriminating a first crash type generally involving a sizable vehicle crush using a jerk measure in accordance with the invention;

FIG. 2 is a flow chart illustrating generally a second method useful for discriminating a second crash type generally involving multiple crash inputs using a jerk measure in accordance with the invention;

DETAILED DESCRIPTION OF THE PREFERRED EMBODIMENT(S)

Figure 3:
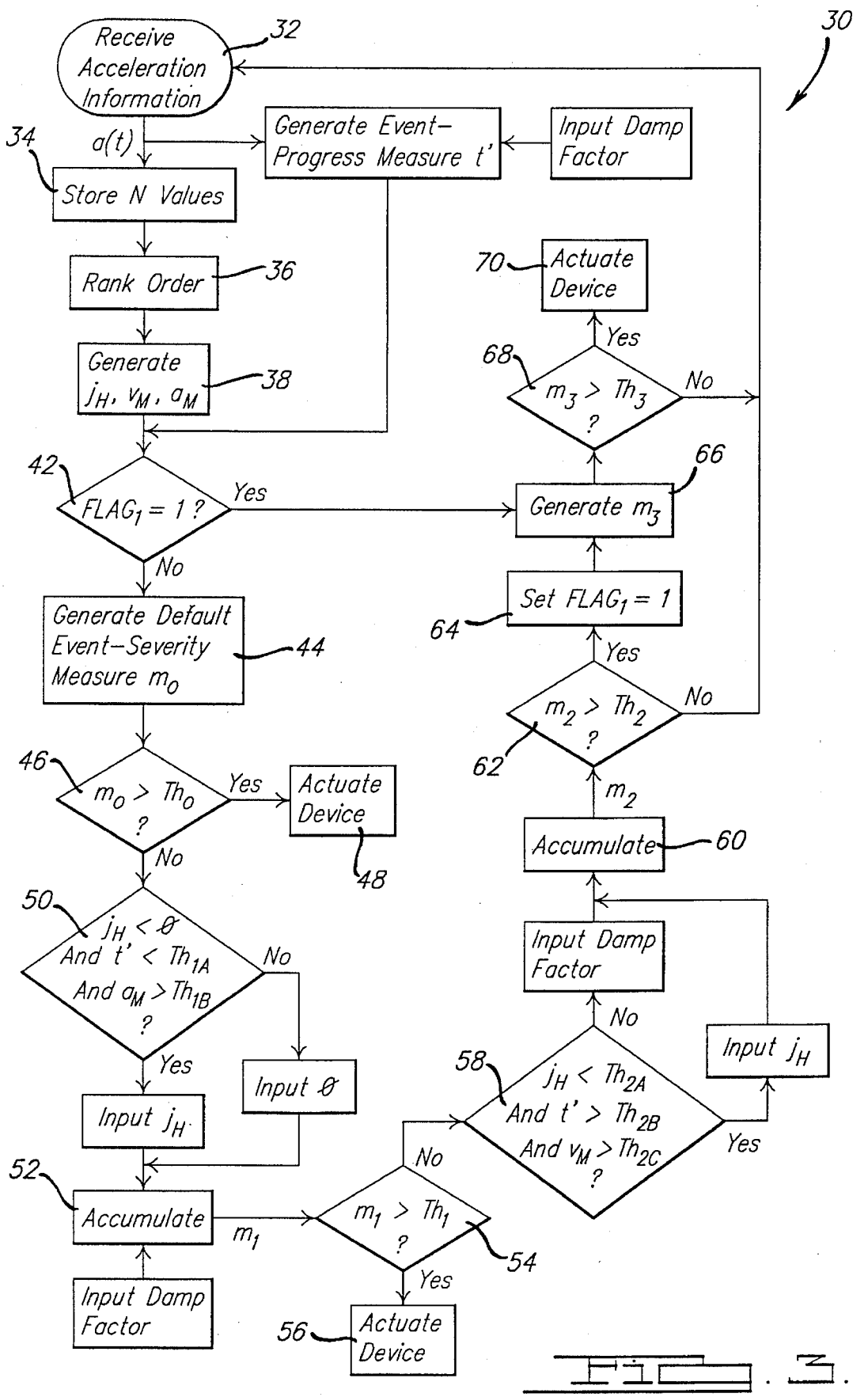
FIG. 3 is a diagrammatic schematic of an exemplary system for controlling actuation of a vehicle passenger safety device in accordance with the invention having a default event-severity measure as supplemented with two event-severity measures useful in discriminating events involving a sizable vehicle crush or a multiple-hit, respectively, upon the identification of the occurrence thereof.

Referring to the drawings, a first method 10 useful for discriminating a first crash type generally involving a sizable vehicle crush in accordance with the invention is illustrated generally by the flow chart shown in FIG. 1. Specifically, received vehicle acceleration information is used to generate a jerk measure, an event-progress measure, and a vehicle acceleration measure, whereupon those measures are input at block 12. If the jerk measure is negative AND the event-progress measure indicates that it is still relatively early in the event AND the acceleration measure is above some minimum value therefor, the jerk measure forms the primary input to an accumulator indicated generally at block 14; otherwise, a zero value forms the primary input to the accumulator. A damp factor forms a secondary input to the accumulator, whereby the output of the accumulator is reduced in the absence of substantive primary inputs thereto. The output of the accumulator is compared to a threshold in decision block 16. If the output of the accumulator exceeds the threshold, a sizable vehicle crush is indicated at block 18. If the output of the accumulator does not exceed the threshold as determined in decision block 16, new values for the jerk measure, the event-progress measure, and the vehicle acceleration measure are input at block 12.

FIG. 2 contains a flow chart illustrating generally a second method 20 useful for discriminating a second crash type generally involving multiple crash inputs using a jerk measure in accordance with the invention. Specifically, received vehicle acceleration information is again used to generate a jerk measure, an event-progress measure, and a vehicle velocity measure, whereupon those measures are input at block 22. If the jerk measure is relatively small AND the event-progress measure indicates that it is relatively late in the event AND the velocity measure is above some minimum value therefor, the jerk measure forms the sole input to an accumulator indicated generally at block 24; otherwise, a damp factor forms the sole input to the accumulator. The output of the accumulator is compared to a threshold in decision block 26. If the output of the accumulator exceeds the threshold, a multiple-hit event is indicated at block 28. If the output of the accumulator does not exceed the threshold as determined in decision block 26, new values for the jerk measure, the event-progress measure, and the vehicle velocity measure are input at input block 22.

Referring to FIG. 3, in an exemplary system 30 for controlling actuation of a vehicle passenger safety device (not shown) in accordance with the invention, digital information representative of instantaneous vehicle acceleration is received at input block 32 (the receipt of which may itself involve generation of an analog signal with an acceleration sensor, the filtering of the analog signal through an anti-aliasing filter, and the conversion of the analog signal into digital information in an analog-to-digital converter, all not shown). The received information a(t) representative of instantaneous vehicle acceleration is thereafter stored in a storage means of length N at block 34 to provide N consecutive stored values.

The resulting data set is divided in half, with each half being input to a respective one of a pair of rank-order filters indicated generally at block 36. The first of the two rank-order filters thereafter outputs a median-ranked "current" acceleration value $a_M$ and the highest-ranked "current" acceleration value from the first half representing the most recent or "current" values in the stored data set, while the second of the two rank-order filters outputs the highest-ranked "past" acceleration value of the older half or "past" values in the stored data set. These ranked values are thereafter supplied to value-generating block 38 wherein the highest-ranked "past" acceleration value is subtracted from the highest-ranked "current" acceleration value to obtain the desired differential measure $j_H$ representative of high-ranked jerk; and wherein the median-ranked "current" acceleration value is accumulated (integrated) over time to obtain a velocity measure $v_M$—the first of two evaluative measures useful in identifying the special events in accordance with the invention (the second of the two evaluative measures being the median-ranked "current" acceleration value $a_M$ itself). The rank-order filters perform a smoothing function to remove any wild variance data, such as high-frequency noise, EMI, or spiky crash data, while retaining significant "edge data."

Along a parallel path, a measure t' correlated with the relative progress of the event is generated from the received vehicle acceleration information a(t) at block 40. A damp factor is simultaneously input into event-progress-measure-generating block 40 which will tend to return the event-progress measure t' back to zero in the absence of significant transitory values for received vehicle acceleration information a(t).

A flag $FLAG_1$ is thereafter checked at decision block 42. As will be described more fully below, the flag $FLAG_1$ is set high (to "logical one") upon identification of the occurrence of a given type of event best analyzed using an alternative or supplemental event-severity measure. If the flag $FLAG_1$ remains low (remains set to "logical zero"), the occurrence of such an event has not yet occurred, and the default event-severity measure $m_0$ is first used to analyze the received acceleration information a(t) and/or measures derived therefrom to see if an event requiring actuation of the safety device has occurred.

More specifically, if the flag $FLAG_1$ is low, a value for the default event-severity measure $m_0$ is generated from received acceleration information a(t) (perhaps with the aid of intermediate measures derived therefrom) at value-generating block 44. For example, the default measure $m_0$ may itself be a prediction-based event-severity measure obtained by multiplying the transitory high-ranked jerk value $j_H$ with the event-progress measure t', thereby providing a predictive value for future vehicle acceleration. The resulting value for the default measure $m_0$ is thereafter compared with a first predetermined threshold value $Th_0$ in decision block 46. If the default measure $m_0$ exceeds the first predetermined threshold value $Th_0$, the safety device is actuated at block 48.

If the default measure $m_0$ does not exceed the first predetermined threshold value $Th_0$, the system 30 uses the previously-generated values for the transitory high-ranked jerk $j_H$, event-progress measure t' and median-ranked acceleration $a_M$ to identify the occurrence of a sizable vehicle crush. Specifically, if the transitory high-ranked jerk $j_H$ is less than zero while the event-progress measure t' is less than a predetermined value $Th_{1A}$ and the median-ranked acceleration a is greater than a predetermined value $Th_{1B}$, as determined in decision block 50, the transitory high-ranked jerk $j_H$ forms the primary input to a first accumulator 52; otherwise, the primary input to the first accumulator 52 is zero. A damp factor forms a secondary input to the first accumulator 52, whereby the output of the first accumulator 52 is reduced in the absence of substantive primary inputs thereto. The output of the first accumulator 52, the first event-identification measure $m_1$, is compared to a predetermined threshold value $Th_1$ in decision block 54. If the first event-identification measure $m_1$ exceeds its threshold $Th_1$, a sizable vehicle crush is indicated and the safety device is immediately actuated at block 56.

If the first event-identification measure $m_1$ output by the first accumulator 52 does not exceed its threshold $Th_1$ as determined in decision block 54, the system 30 uses the previously-generated values for the transitory high-ranked jerk $j_H$, event-progress measure t', and median-ranked velocity $v_M$ to identify the occurrence of a multiple-hit event. Specifically, if the transitory high-ranked jerk $j_H$ is less than a predetermined (small) maximum value $Th_{2A}$ while the event-progress measure t' is greater than a predetermined value $Th_{2B}$ and the median-ranked velocity $v_M$ is greater than a predetermined value $Th_{2C}$, as determined in decision block 58, the transitory high-ranked jerk $j_H$ forms the sole input to a second accumulator 60; otherwise, the sole input to the second accumulator 60 is a damp factor. The output of the second accumulator 60, the second event-identification measure $m_2$, is compared to a predetermined threshold $Th_2$ in decision block 62.

If the second event-identification measure $m_2$ does not exceed the threshold $Th_2$ as determined in decision block 62, the system 30 returns to input block 32 to receive a new value for received acceleration information a(t), and the analysis begins again (with the flag $FLAG_1$ still set low). If, however, the second event-identification measure $m_2$ exceeds the threshold $Th_2$, a multiple-hit event is indicated, and the flag $FLAG_1$ is set high at block 64 to ensure the further use by the system 30 only of a supplemental event-severity measure $m_3$ as generated from received acceleration information a(t) and/or intermediate measures derived therefrom in value-generating block 66. The supplemental event-severity measure $m_3$ is compared to a predetermined threshold value $Th_3$ in decision block 68, with the safety device being actuated at block 70 when the supplemental event-severity measure $m_3$ exceeds the threshold $Th_3$. If the supplemental event-severity measure $m_3$ does not exceed the threshold $Th_3$, new vehicle acceleration information is received at input block 32, with further values being generated only for the supplemental event-severity measure $m_3$ for comparison with its threshold $Th_3$ by virtue of the bypass triggered by the value of the flag $FLAG_1$ at decision block 42.

While the preferred embodiment of the invention has been disclosed, it should be appreciated that the invention is susceptible of modification without departing from the spirit of the invention or the scope of the subjoined claims.

We claim:

1. A method for controlling actuation of a vehicle passenger safety device in response to an event possibly requiring actuation of said safety device comprising the steps of:

receiving information representative of instantaneous vehicle acceleration;

storing a plurality of consecutive values for said received information in a storage means;

generating a first differential measure which is evaluative of one of said stored values relative to another of said stored values;

generating a measure correlated with the progress of said event based on said received acceleration information;

generating a measure which is evaluative of said received information in relation to a sampling period;

comparing each of said first differential measure, said progress measure and said evaluative measure to respective first, second and third threshold values;

determining if said comparing step is indicative of an occurrence of a first predetermined type of vehicle crash event; and generating a default crash discrimination measure if said comparing step is not indicative of said first predetermined type of vehicle crash event, and a first alternative crash discrimination measure particularly correlated with said first predetermined type of crash event if said comparing step is indicative of the occurrence of said first predetermined type of crash event, wherein the generated crash discrimination measure is compared to an associated threshold value and said safety device is actuated if said associated threshold value is exceeded.

2. The method of claim 1 wherein said first differential measure is a jerk value evaluative of the rate of change of said received acceleration information in relation to time.

3. The method of claim 1 further including the step of rank-ordering said stored values, and wherein said first differential measure is evaluative of the difference between two of said stored values having predetermined ranks.

4. The method of claim 1 further comprising the steps of in response to said default discrimination measure being generated and not exceeding its associated threshold value, determining whether a second predetermined type of crash event has occurred by comparing said first differential measure, said progress measure, and said evaluative measure to respective fourth, fifth, and sixth threshold values; and generating a second alternative crash discrimination measure particularly correlated with said second predetermined type upon the determination of the occurrence of said second predetermined type of crash event.

5. The method of claim 4 including the further step of actuating said safety device immediately upon determining the occurrence of said second predetermined type of crash event.

6. The method of claim 4 wherein said evaluative measure approximates transitory vehicle acceleration, and wherein the occurrence of said second predetermined type of crash event measure is indicated only when said first differential measure is less than zero and said progress measure is less than said fifth threshold value and said evaluative measure is greater than said sixth threshold value.

7. The method of claim 4 wherein said second predetermined type of crash event comprises a sizeable vehicle crush type of crash event.

8. The method of claim 1 wherein said evaluative measure approximates transitory vehicle velocity, and wherein said first predetermined type of crash event is indicated only when said first differential measure is less than said first threshold value and said progress measure is greater than said second threshold value and said evaluative measure is greater than said third threshold value.

9. The method of claim 1 wherein said step of generating said first alternative crash discrimination measure comprises the steps of:

generating a measure predictive of the severity of said event;

comparing said predictive measure to a seventh threshold value; and actuating said safety device if said predictive measure exceeds said seventh threshold value.

10. The method of claim 9 wherein the step of generating said predictive measure includes the step of accumulating said received information over time.

11. The method of claim 9 wherein the step of generating said predictive measure includes the steps of:

generating a second differential measure based on said stored values; and accumulating said second differential measure over time.

12. The method of claim 11 wherein said second differential measure is a jerk value evaluative of the rate of change of said received acceleration information in relation to time.

13. The method of claim 11 further including the step of rank-ordering said stored values, and wherein said second differential measure is a variance measure evaluative of the difference between two of said stored values having predetermined ranks.

14. The method of claim 1 wherein said first predetermined type of crash event comprises a multiple collision type of crash event.

15. The method of claim 1 including the further step of damping said progress measure with a damp factor.

16. A system for controlling actuation of a vehicle passenger safety device in response to an event possibly requiring actuation of said safety device comprising:

means for receiving information representative of instantaneous vehicle acceleration;

means for storing a plurality of consecutive values for said received information;

means for generating a first differential measure which is evaluative of one of said stored values relative to another of said stored values;

means for generating a measure correlated with the progress of said event based on said received acceleration information;

means for generating a measure which is evaluative of said received information in relation to a sampling period;

first means for comparing each of said first differential measure, said progress measure, and said evaluative measure to respective first, second, and third threshold values;

means responsive to said comparator means for determining the occurrence of a first predetermined type of vehicle crash event; and means for generating a default crash discrimination measure if said first predetermined type of crash event has not occurred, and a first alternative crash discrimination measure which is particularly correlated with said first type of crash event if said first type of crash event has occurred, wherein the generated crash discrimination measure is compared to an associated threshold value and said safety device is actuated if said associated threshold value is exceeded.

17. The system of claim 16 wherein said first differential measure is a jerk value evaluative of the rate of change of said received acceleration information in relation to time.

18. The system of claim 16 further including means for rank-ordering said stored values, and wherein said first differential measure is evaluative of the difference between two of said stored values having predetermined ranks.

19. The system of claim 16 further comprising:

means for determining that said default crash discrimination measure has been generated but has not exceeded its associated threshold value;

second means for comparing each of said first differential measure, said progress measure, and said evaluative measure to respective fourth, fifth, and sixth threshold values;

means responsive to said second comparing means for determining the occurrence of a second predetermined type of crash event; and means for generating a second alternative crash discrimination measure which is particularly correlated with said second predetermined type of crash event if said second predetermined type of crash event has occurred.

20. The system of claim 19, wherein said evaluative measure approximates transitory vehicle acceleration, and wherein the occurrence of said second predetermined type of crash event is determined only when said first differential measure is less than zero and said progress measure is less than said fifth threshold value and said evaluative measure is greater than said sixth threshold value.

21. The system of claim 19 wherein said first predetermined type of crash comprises a multiple collision type of crash event, and said second predetermined type of crash comprises a sizeable vehicle crush type of crash event.

22. The system of claim 16 wherein said means for generating said first alternative crash discrimination measure further comprises means for generating a measure predictive of the severity of said event;

"means for comparing said predictive measure to a seventh threshold value; and means for actuating said safety device if said predictive measure exceeds said seventh threshold value."

23. The system of claim 16 wherein said evaluative measure approximates transitory vehicle velocity, and wherein said first predetermined type of crash event is determined only when said first differential measure is less than a said first threshold value and said progress measure is greater than said second threshold value and said evaluative measure is greater than said third threshold value.

24. The system of claim 22 wherein said means for generating said predictive measure accumulates said received information over time.

25. The system of claim 22 wherein said means for generating said predictive measure generates a second differential measure based on said stored values, and accumulates said second differential measure over time to obtain said second predictive measure.

26. The system of claim 25 wherein said second differential measure is a jerk value evaluative of the rate of change of said received acceleration information in relation to time.

27. The system of claim 25 further comprising means for rank-ordering said stored values, and wherein said second differential measure is a variance measure evaluative of the difference between two of said stored values having predetermined ranks.

28. The method of claim 16 further including means for damping said progress measure with a damp factor.

* * * * *